Oct. 1, 1968 J. H. STREETS ET AL 3,404,241

HELICAL SCAN MAGNETIC TAPE APPARATUS WITH SELF-ENERGIZED AIR LUBRICATION

Filed Feb. 12, 1965 3 Sheets-Sheet 1

JOHN H. STREETS and
ALEXANDER R. MAXEY
INVENTORS

BY Robert G. Clay

ATTORNEY

JOHN H. STREETS and
ALEXANDER R. MAXEY
INVENTORS

BY Robert G. Clay

ATTORNEY

JOHN H. STREETS and
ALEXANDER R. MAXEY
INVENTORS

BY Robert G. Clay

ATTORNEY

United States Patent Office 3,404,241
Patented Oct. 1, 1968

3,404,241

HELICAL SCAN MAGNETIC TAPE APPARATUS WITH SELF-ENERGIZED AIR LUBRICATION

John H. Streets, Redwood City, and Alexander R. Maxey, Newark, Calif., assignors to Ampex Corporation, Redwood City, Calif., a corporation of California
Filed Feb. 12, 1965, Ser. No. 432,312
10 Claims. (Cl. 179—100.2)

ABSTRACT OF THE DISCLOSURE

A helical scanning magnetic tape apparatus having a pair of coaxially aligned closely spaced drums defining a gap therebetween with means for rotating at least one magnetic transducer head in the vicinity of the gap. Guiding means guide the tape along a helical path about the drums in a substantial diagonal path across the gap. At least one of the drums is rotated to establish an air film beneath the tape as it moves helically about the drums.

This invention relates generally to the helical scanning of magnetic tape to record signals thereon over a broad frequency spectrum and/or to reproduce the signals therefrom, and is more particularly directed to apparatus for this purpose which is arranged to provide a self-energizing air film or bearing for supporting the tape during the helical scanning operation.

In the recording of broad band signals on magnetic tape and the subsequent reproduction of the signals therefrom, helical scanning of the tape may be employed to increase the density of signal contained in each track of the tape. This is desirable, for example, in the recording and playback of television signals inasmuch as an entire field, or in some instances an entire frame, may be included in a single relatively long track recorded on the tape. This eliminates various switching and synchronization problems formerly encountered in combining a relatively large number of tracks to reproduce a single frame. A description of helical scanning apparatus and a discussion of the advantages thereof are included in U.S. Patent No. 2,998,495, which issued Aug. 29, 1961. Basically, such apparatus includes a pair of stationary cylindrical guides which are axially spaced to define an annular gap therebetween. Magnetic tape is wrapped helically about the guides and traverses the gap as the tape is moved in the direction of its length between tape supply and takeup rels by capstan drive means. One or more transducer heads mounted on a drum rotated within the guides sweep a rectilinear area of tape exposed through the gap, such rectilinear area extending at an acute angle across the tape exposed through the gap. As a result relatively long spaced successive tracks extend across the tape at acute angles to the edges thereof.

In helical scanning apparatus of the type outlined above, substantial rubbing friction is exerted on the tape as it is moved helically about the guides. This friction is not only undesirable from the standpoint of tape wear, but in addition the frictional effects are unstable and contribute materially to tape tension variations which in turn degrade the time base stability of the recorded and/or reproduced signals. Past attempts to minimize the friction have involved relatively elaborate systems for the forced air lubrication of the tape, e.g., systems of the type disclosed in the previously referenced Patent No. 2,998,495. These forced air lubrication systems require relatively costly pumps, calibrated orifices, and complex plumbing to establish an air film or bearing between the guides and tape for minimizing the friction. Moreover, sufficient unstable frictional effects remain with past forced air lubrication systems that servo systems of relatively great complexity are still required to compensate the resulting tape tension variations and thereby increase the time base stability to an acceptable level. Where helical scanning apparatus has been provided without some form of air lubrication, the tape tension variations have been such as to require rather elaborate tension regulating systems to smooth the variations sufficiently that tape and head positioning servos may be practically employed. For example, double pinch roller single capstan drive systems, a tape tension sensing arm in conjunction with a takeup reel braking system, or the like, have been required to smooth out the variations in tape tension by a reasonable amount. As a result previous helical scan recording systems have been relatively costly.

It is therefore an object of the present invention to provide helical scan magnetic tape recording and/or reproducing systems which are arranged to produce a stable self-energizing air film between the guides or drums of the scanning assembly thereof and magnetic tape in a helical wrap about the guides or drum.

Another object of the invention is the provision of a helical scanning system of the class described which is so arranged that a lubricating air film is maintained under the entire tape surface with complete separation of the tape from the guide drums.

Still another object of the invention is the provision of a helical scanning system having contrarotating cylindrical tape guide drums which thereby establish an air film beneath the tape generated from opposite directions diagonally thereof such that the edges of the tape do not cause breakdown of the air film.

It is still another object of the invention to provide a helical scanning system of the character outlined above wherein the magnetic transducer head or heads may be incorporated in one of the rotating drums, thereby eliminating the requirement of the usual separate rotary transducer drum.

Yet another object of the invention is to provide a contra-rotational self-energizing air film helical scanning system which enables drum starts to be made without tape damage by virtue of any drag forces exerted on the tape being equal and in opposite directions in the respective halves of the tape.

It is a further object of the invention to provide a contra-rotational self-energizing air film helical scanning system which is of relatively simple and economical design.

A still further and very important object of the invention is to provide a helical scanning system of the class described which facilitates the provision of relatively low cost broad band magnetic tape recording and reproducing equipment by materially simplifying the air lubricating system and eliminating elaborate tape tension regulating systems while still reducing the complexity of the servo systems required to provide adequate time base stability of the signal. Additional objects and advantages of the invention will become apparent upon consideration of the following description of the invention in conjunction with the accompanying drawings, wherein:

In accordance with the basic aspects of the present invention there is provided a helical scanning assembly including a pair of coaxially aligned closely spaced cylindrical guides or drums about which magnetic tape is wrapped helically. Capstan drive means are employed to move the tape in the direction of its length between tape supply and takeup reels, the tape passing helically about the drums in transit between the reels. As a very important feature of the invention a self-energized air film bearing is established beneath the tape as it moves helically about the cylindrical drums to reduce rubbing friction to a minimum. In this regard, at least one, and preferably both drums are rotated to sweep currents of air continuously beneath the tape in directions diagonally thereof. In the preferred arrangement wherein both drums are rotated, the drums are rotated in opposite directions selected to respectively sweep air beneath the tape from its points of entry to, and exit from, the drums. This sweeping of air by the contra-rotating drums diagonally beneath the tape from opposite directions prevents the edges of the tape from causing breakdown of the air film. A complete lubricating air film is thus established and maintained transversely beneath the tape, and the film may be such as to permit the tape to dip slightly inward in the region of the narrow gap between the drums. This dipping is advantageous in that good contact between the tape and one or more magnetic scanning heads rotating in the vicinity of the gap is facilitated. In this regard, the head or heads are preferably mounted upon one of the rotary drums adjacent the gap. The requirement for a separate rotary head drum is thus eliminated.

Figure 1:
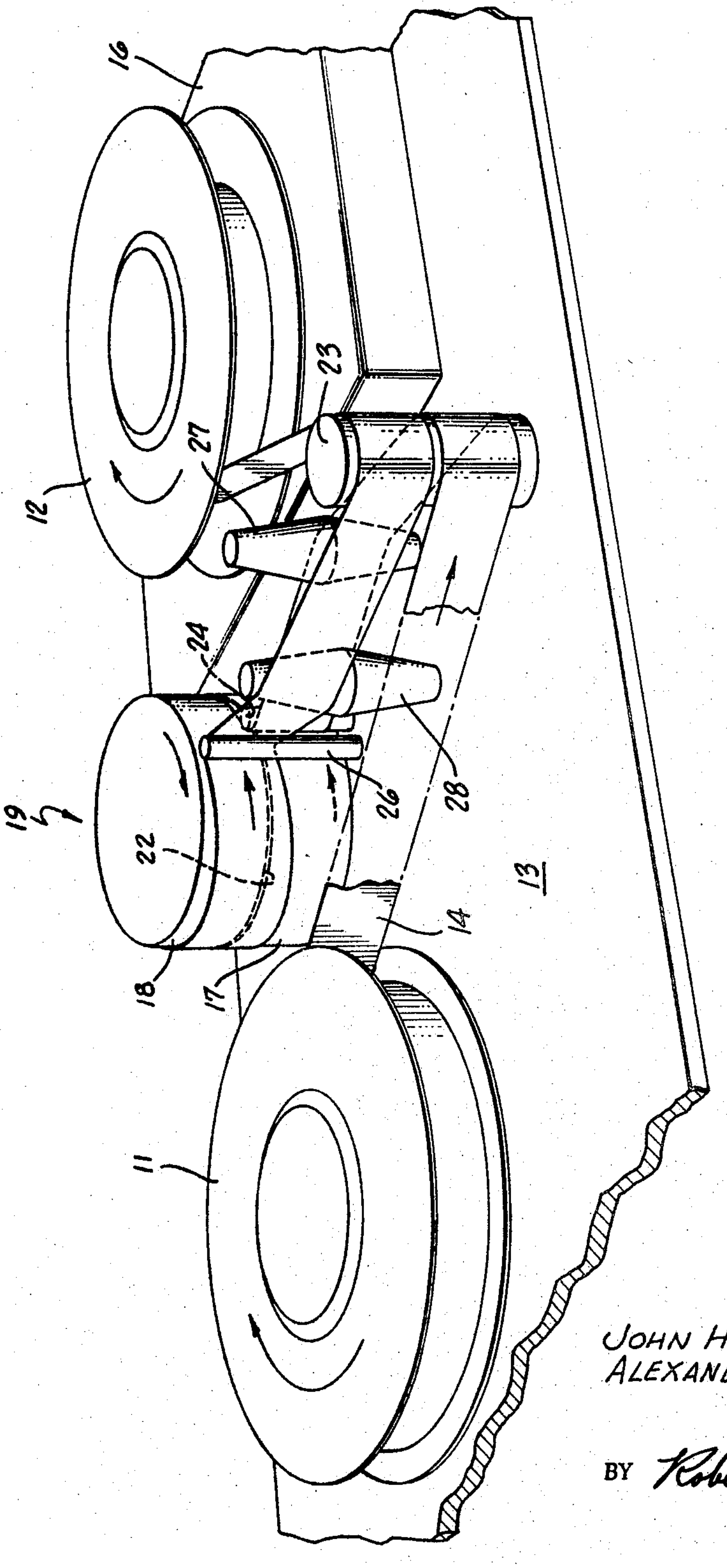
FIGURE 1 is a fragmentary perspective view of a tape transport incorporating a self-energizing air film helical scanning system in accordance with the present invention.
Figure 3:
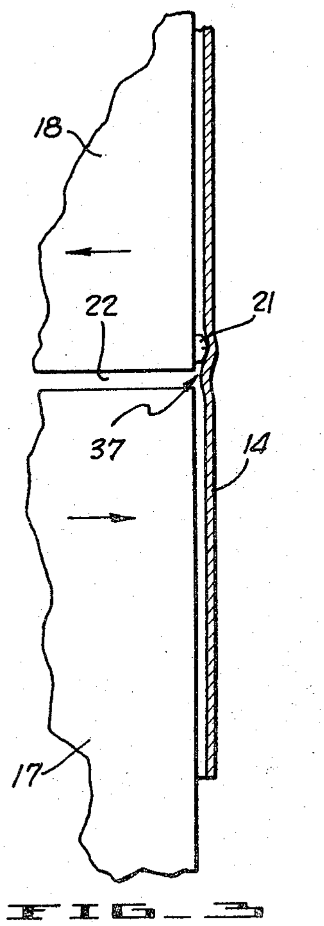
FIGURE 3 is an enlarged fragmentary sectional view taken at line 3—3 of FIGURE 2.
Figure 4:
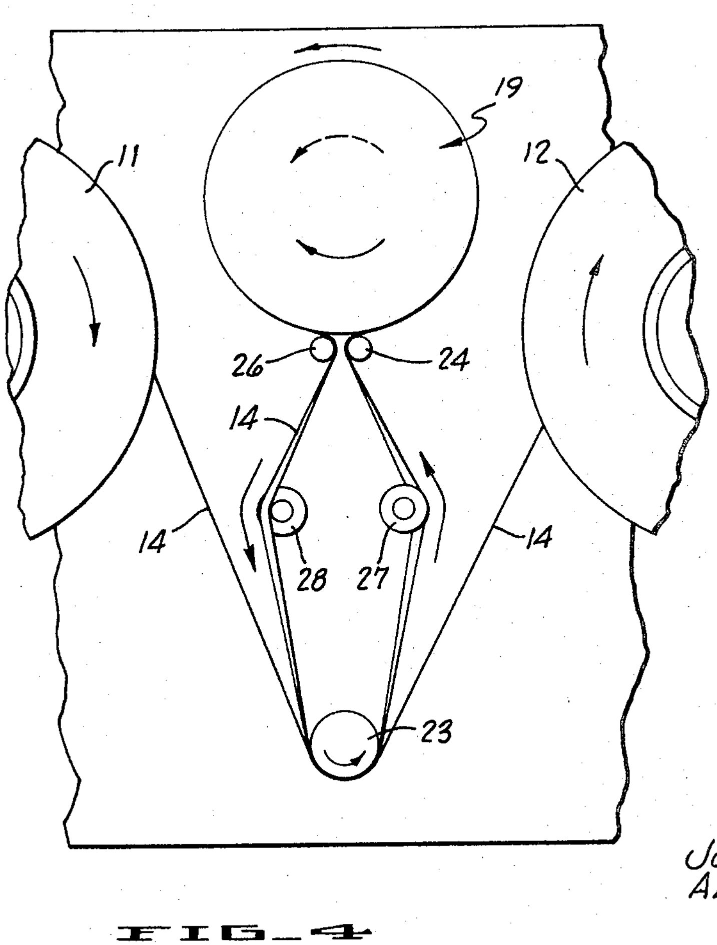
FIGURE 4 is a fragmentary plan view of the tape transport illustrating particularly the guide means employed to feed tape to the scanning assembly in a helical wrap thereabout.

Considering now the invention in greater detail as to its incorporation in magnetic tape recording and reproducing apparatus, and as to the preferred structure of the helical scanning assembly, the tape transport of the aparatus is illustrated in FIGURE 1 and will be seen to include supply and takeup reels 11 and 12 mounted for rotation upon a panel or deck 13 at spaced positions thereof, and which serve to store the magnetic tape 14. The supply reel 11 is mounted upon the deck surface proper, while the takeup reel 12 is mounted upon an upwardly stepped raised support portion 16 so as to be elevated with respect to the supply reel for purposes subsequently described. The supply and takeup reels are coupled to electric drive motors (not shown) in a conventional manner which are arranged to maintain tape tension and to wind up the tape on the takeup reel during normal operation. The length of tape 14 extending between the reels is wrapped helically about coaxially and closely spaced contra-rotatable cylindrical guides or drums 17 and 18 of the type outlined hereinbefore of a scanning assembly 19 in accordance with the present invention. The scanning assembly is mounted upon the deck 13 at a position intermediate the supply and takeup reels with the rotational axis of the drums being parallel to the rotational axes of the reels. In addition, as best shown in FIGURE 3, a magnetic head 21 is mounted in one drum 17 adjacent the gap 22 therebetween.

In order to facilitate driving and guidance of the tape helically about the scanning assembly drums 17 and 18, a rotatable capstan 23 is mounted upon the deck 13, in forwardly spaced parallel relation to the scanning assembly. More particularly, a line between the drum and capstan axes extends transversely of the deck 13 and thus right angularly intersects a line between the reel axes which extends longitudinally of the deck. Uniformly cylindrical entrance and exit guide posts 24 and 26 are mounted upon the deck in close longitudinally spaced relation on opposite sides of the aforementioned transverse line. The posts are parallel to the axis of the drums and are in close spaced relation to the peripheries thereof. In addition, a pair of spindles 27 and 28 are mounted upon the deck in relatively widely longitudinally spaced relation on opposite sides of the transverse line at points between the capstan and posts. The tape leaving the supply reel extends around the lower portion of the capstan 23, outwardly about the downwardly tapered lower half of spindle 27, through the gap between posts 24 and 26, around the inner periphery of the entrance post 24 and tangentially upon the lower cylindrical drum 17 of the scanning assembly. By virtue of the spindle 27, the tape is twisted slightly to slant the lower edge thereof inwardly towards the transverse line between the capstan and scanning assembly. This twist causes the tape entering the scanning assembly to traverse an upward path as it extends substantially 360° therearound to the exit post 26. The tape thus extends about the scanning assembly in a helical wrap. The taper of the spindle 27 is selected, moreover, to impart a pitch to the helical wrap which positions substantially the entire width of the tape over the upper drum 18 at a point adjacent the exit post 26. The tape then tangentially leaves the upper drum to extend around the inner periphery of the exit post and through the gap between the posts. The departing tape extends outwardly about the upwardly tapered upper half of the spindle 28 and around the upper portion of the capstan onto the takeup reel 12. The twist imparted to the helically wrapped tape in leaving the scanning assembly is relieved by virtue of an equal and oppositely directed twist being applied to the tape as it extends about the spindle 28. The taper of the upper half of this spindle is equal but opposite to that of the lower half of spindle 27 such that the tape is twisted to slant the lower edge thereof outwardly from the transverse line between the scanning assembly and capstan by an amount equal to the inward slant of the lower edge arising from the original twist effecting the helical wrap. Thus all twisting force is relieved before the departing tape reaches the capstan such that the tape extends uniformly thereabout and is directed uniformly tangentially upon the takeup reel without kinking or twisting. As previously noted, by virtue of the helical wrap, the tape rises in passing around the scanning assembly. It is for this reason that the takeup reel is mounted in elevated position upon raised portion 16.

Although the guidance arrangement of the tape transport illustrated in the drawings and herein described is such as to provide an "omega" helical wrap about the scanning assembly 19, it is to be noted that this specific form of wrap is purely exemplary, and that other helical wraps extending exactly 360°, or substantially less than 360° may as well be employed with the scanning assembly of the invention by appropriate modification of the tape guidance system. A 180° wrap may, for example, be employed with two heads mounted at diametrically opposed points of the head drum to facilitate recording and playback of tracks containing complete fields of a television signal, as opposed to complete frames recorded and reproduced by a single head scanning the tape in a substantially 360° wrap.

Figure 2:
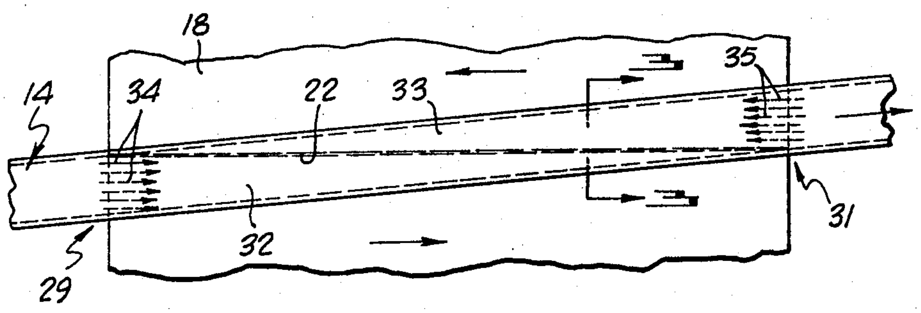
FIGURE 2 is a developed planar view of the peripheral surfaces of the cylindrical guides of the scanning system, illustrating the manner in which an air film is established beneath magnetic tape passing thereover.

Considering now the scanning assembly 19 in greater detail as to the establishment of a self-energizing air film under the helically wrapped tape, provision is made to counter rotate the drums 17 and 18 in order to sweep air beneath the tape from the entrance and exit points of the tape to and from the drums. The air is swept diagonally of the tape with the air current swept under the tape from the entrance point extending beneath one diagonal half of the helical wrap of tape, and the air current swept under the tape from the exit point extending beneath the other diagonal half of the wrap. The foregoing will be better understood upon reference to FIGURE 2 which is a planar development of the cylindrical peripheries of the drums 17 and 18 and the tape 14 wrapped helically therearound. In this figure, the entrance point of the tape adjacent post 24 is indicated at 29 while the exit point adjacent post 26 is indicated at 31. It will be noted that the tape extends symmetrically across the gap 22 at an acute angle thereto with substantially the entire width of the tape overlying the drum 17 at the entrance point 29 and overlying the drum 18 at the exit point 31. The tape is hence substantially diagonally bisected by the gap 22 between the entrance and exit points 29 and 31. One diagonal half 32 of the tape thus overlies the drum 17 while the other diagonal half 33 overlies the drum 18. Tape half 32 converges in a direction from entrance point 29 towards exit point 31, and tape half 33 converges in the opposite direction from exit point 31 towards entrance point 29. The drums 17 and 18 rotate beneath the tape halves 32 and 33 in directions toward the converging points thereof. Thus as viewed in the drawings, drums 17 and 18 respectively rotate clockwise and counterclockwise. Air is thus swept beneath the tape half 32 clockwise from the entrance point 29 as indicated by the arrows 34. Similarly, air is swept beneath tape half 33 counterclockwise from the exit point 31 as indicated by the arrows 35. This has the effect of stably maintaining an air film beneath the tape with film adjacent the tape edges being insured. As a result, breakdown of the film due to edge effects is prevented. The air film holds the tape out of contact with the drums 17 and 18 across the entire width of the tape, although in the vicinity of the gap 22 the tape dips slightly inward towards the drums, as indicated at 37 in FIGURE 3. This inward dipping of the tape, however, is desirable inasmuch as it insures good contact with the head 21 carried by the drum 18. The amount of dipping may of course be controlled by selection of the gap width. The greater the gap width the greater the amount of dipping. The gap width tolerance is of course not as critical as in previous systems where the heads are carried on a rotating drum between two fixed guides. A relatively large amount of dipping is desired where the head or heads are mounted substantially flush with the drum surface to provide good head to tape contact. On the other hand, the amount of head projection may be slightly increased, in which case little or no dipping of the tape is required to provide good head to tape contact.

By virtue of the self-energizing air film resulting from the contra-rotating drums, rubbing friction on the tape is reduced to an absolute minimum without requirement of a complex and expensive forced air lubricating system. Moreover, the substantial effectiveness of the air film in reducing rubbing friction is such that irregularities in tape speed and head speed resulting therefrom are minimal. Consequently, the complexity and expense of the servo systems associated with the head and capstan drives of the apparatus to compensate for irregularities and establish an adequate level of time base stability of the recorded and reproduced signals, are of relatively low order.

Inasmuch as the head 21 is carried by the drum 18, this drum is driven in the manner of a conventional head drum by a head drum motor having an associated servo system for appropriately controlling the speed thereof. Driven rotation of the other drum 17 in the opposite direction may be variously effected from the same, or a separate motor. For example, an epicyclic drive, cross belt drive, or the like, may be employed to couple the drums 17 and 18 for rotation in opposite directions from a single motor. As another alternative, the head drum motor may be employed to drive the drum 18, while the capstan motor may be employed to drive the drum 17, the latter drum serving as the required capstan inertia which conventionally entails the provision of a fly-wheel, or the like. The drums are preferably driven at substantially equal speeds, although a stable air film is maintained over a liberal range of speed differentials. One advantage resulting from rotation of the drums at equal speeds is that any drag forces between the tape and scanning assembly are equal and in opposite directions in the two diagonal halves of the tape. The tape is hence inherently stable, and starting and stopping of the drums is accomplished without tape damage.

Figure 5:
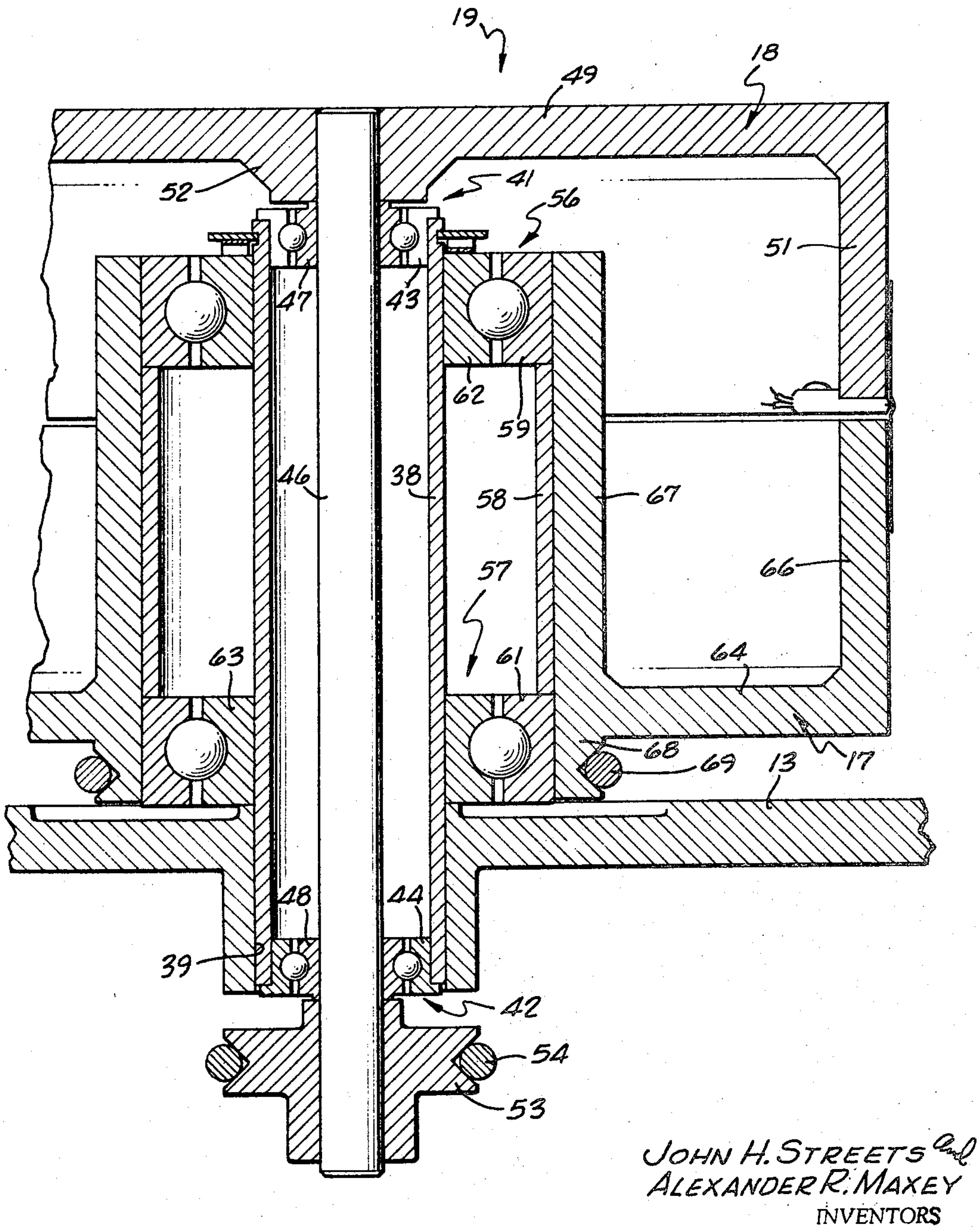
FIGURE 5 is a sectional view taken at a diametric plane through a preferred form of the scanning assembly.

Numerous structural alternatives are possible in the provision of the contra-rotational scanning assembly 19, as previously mentioned. One of these structural arrangements which is particularly advantageous from the standpoint of simplicity is illustrated in FIGURE 5. The scanning assembly 19 depicted therein is of the type which is arranged to facilitate driving of the drums 17 and 18 by separate motors, such as a head drum motor (not shown) and the capstan motor (not shown). In this regard, a fixed bushing 38 extends through a bore 39 provided in deck 13 and projects upwardly therefrom. Bearings 41 and 42 are provided with their outer races 43 and 44 secured in fixed position coaxially within the opposite ends of the bushing. A shaft 46 extends coaxially through the bushing and through the inner races 47 and 48 of bearings 41 and 42. The shaft is fixedly secured to the inner races and is hence readily rotatable with respect to the bushing and deck. The shaft 46 serves to journal the drum 18 which is preferably of cylindrical cupped configuration including a circular end portion 49 and annular peripheral portion 51 depending therefrom. The end portion 49 is formed centrally with a hub 52 which is fixedly secured to the end of the shaft 46 projecting from the upper bearing 41. The drum 18 is thus rotatable with the shaft. A pulley 53 is secured to the opposite end of the shaft subjacent the deck 13, such pulley receiving a belt 54 driven by the drum motor (not shown) and in turn effecting rotation of the drum 18.

An outer assembly is provided about the bushing 38 for rotatably mounting the drum 17. This journal assembly includes a pair of bearings 56 and 57 which are secured in coaxially spaced relation by means of a cylindrical tubular body 58 having its opposite ends secured to the outer races 59 and 61 of these bearings. The inner races 62 and 63 of bearings 56 and 57 are coaxially outwardly secured in fixed relation to the bushing 38. The outer races 59 and 61 and the body 58 are thus freely rotatable coaxially about the bushing. The drum 17 is fixedly secured to the outer races and body to be thus rotatable therewith. In this regard, the drum 17 is preferably of cylindrical cupped configuration generally similar to that of drum 18. More particularly, the drum includes a circular end portion 64 and annular peripheral portion 66, however, in the case of this drum, the end portion is formed with a reentrant bushing 67. The bushing receives the outer races 59 and 61 and the body 58 which are secured in fixed position therein. The drum 17 is thereby rotatable coaxially about the bushing 38, and as thus mounted, the peripheral portion 66 of this drum is disposed in closely spaced coaxially aligned facing relation to the peripheral portion 51 of drum 18. To facilitate driven rotation of the drum 17, the end portion 64 thereof is advantageously formed with a pulley 68 on its exterior face for receiving a drive belt 69 coupled to the capstan drive system so as to be driven by the capstan motor (not shown). The drums 17 and 18 are rotated in opposite directions by means of the belts 69 and 54 to effect the self-energized air film beneath the helically wrapped tape 14 in the manner previously explained.

Typical operating characteristics of a self-energizing air film helical scanning assembly in accordance with the invention are drum surface velocities of the order of 950 i.p.s and tape consumption of the order of 7½ sq. i.p.s. to provide a signal bandwidth of the order of 3 mc.

Although the invention has been hereinbefore described and illustrated in the drawings with respect to a single preferred embodiment, it will be appreciated that numerous variations and modifications may be made therein without departing from the true spirit and scope of the invention. For example, although the scanning assembly 19 has been described with respect to right cylindrical drums, it is to be noted that the drums may be slightly tapered so as to provide a conical contra-rotational helical scanning assembly. Thus it is not intended to limit the invention except by the terms of the appended claims.

What is claimed is:

1. In magnetic tape apparatus, a helical scanning assembly comprising a pair of substantially cylindrical coaxially closely spaced drums defining a gap therebetween, means for guiding magnetic tape along a helical path about said drums extending substantially diagonally across said gap, means for rotating at least one of said drums at a speed sufficient to establish an air film beneath the moving tape extending about said drums, and means for rotating at least one magnetic transducer head in the vicinity of said gap as the tape moves along the helical path.

2. In magnetic tape apparatus, a helical scanning assembly comprising a pair of substantially cylindrical drums disposed in closely spaced coaxial relation and defining a clearance gap therebetween, means for guiding magnetic tape along a helical path about said drums extending substantially diagonally across said gap from an entrance point overlying one drum to an exit point overlying the other drum, means for rotating said drums in opposite directions to respectively sweep air beneath said tape from said entrance and exit points, and means for rotating at least one magnetic transducer head coaxially of said drums in the vicinity of said gap as the tape is moved along the helical path.

3. The combination of claim 2, further defined by said head being mounted upon one of said drums adjacent said gap, said means for rotating said head thereby comprising said one drum.

4. In magnetic tape apparatus, a helical scanning assembly comprising a pair of cylindrical drums disposed in closely spaced coaxial relation and having a clearance gap therebetween, means for guiding magnetic tape along a helical path extending substantially 360° about said drums, said path extending from an entrance point adjacent one drum to an exit point adjacent the second drum with said tape being substantially diagonally bisected by said gap into two diagonal halves respectively converging in directions away from said entrance and exit points and overlying said first and second drums, means for rotating said drums in opposite directions towards the converging portions of the respective tape halves to sweep air beneath said tape from said entrance and exit points to establish an air film beneath the tape extending about the drums, and a magnetic transducer head mounted upon said second drum adjacent said gap.

5. Magnetic tape apparatus comprising a tape deck having a raised portion thereon, tape supply and takeup reels mounted for rotation upon said deck at longitudinally spaced positions thereof, said takeup reel mounted on said raised portion, a pair of cylindrical drums mounted in closely spaced coaxial relation upon said deck for rotation about an axis parallel to the axis of said supply and takeup reels and longitudinally intermediate same, a capstan mounted for rotation upon said deck for rotation about an axis parallel to said axis of said drums at a position transversely spaced therefrom, a pair of spindles mounted upon said deck at equal longitudinally spaced points on opposite sides of a transverse line between the axes of said drums and capstan, entrance and exit guide posts mounted upon said deck in close longitudinally spaced relation on opposite sides of said transverse line in close spaced relation to the peripheries of said drums, a magnetic transducer head carried by one of said drums at a point adjacent a clearance gap therebetween, and means coupled to said drums for rotating same in opposite drections to sweep air beneath said tape and establish an air film beneath the tape about said drums.

6. A self-energizing air film magnetic tape scanning assembly for mounting upon the deck of magnetic tape apparatus comprising a bushing extending through said deck and projecting therefrom, a shaft journalled for rotation coaxially of said bushing and having its opposite ends projecting therefrom, a first cylindrical cupped drum including a circular end portion and annular peripheral portion, said circular end portion fixedly centrally secured to one end of said shaft with said annular peripheral portion coaxially outwardly spaced from said bushing, first drive means coupled to the other end of said shaft for rotating same, a tubular body disposed in outwardly spaced coaxial relation to said bushing and journalled for rotation thereabout, a second cylindrical cupped drum including a circular end portion and annular peripheral portion, said end portion of said second drum having a reentrant bushing, said second drum disposed with said reentrant bushing fixedly coaxially secured about said body and the peripheral portion thereof in closely spaced coaxially aligned facing relation to the peripheral portion of said first drum, second drive means coupled to said second drum for rotating same in an opposite direction of said first drum, at least one magnetic transducing head carried by said drums adjacent the gap therebetween, and means for guiding magnetic tape along a helical path about said drums extending substantially diagonally across said gap, said drums adapted to sweep air beneath said tape and establish an air film beneath the tape about said drums.

7. In magnetic tape apparatus, a helical scanning assembly comprising first and second rotatable cylindrical drums disposed in closely spaced coaxial relation, at least one magnetic transducer head mounted upon said first drum, drive means coupled to said drums for rotating same in opposite directions, and means for transporting magnetic tape along a helical path over the peripheral surfaces of said drums with said tape being substantially diagonally bisected by a plane perpendicular to the axis of said drums and interposed therebetween, said tape being transported from an entrance point overlying said second drum to an exit point overlying said first drum in a direction opposite to the direction of rotation of said first drum, said drums rotating at a speed sufficient to establish an air film beneath the tape extending about said drums.

8. The combination of claim 7, further defined by one head being mounted upon said first drum and said helical path extending substantially 360° about said drums.

9. Magnetic tape apparatus comprising a tape deck, tape supply and takeup reels mounted for rotation upon said deck at longitudinally spaced positions thereof, first and second cylindrical drums mounted in closely spaced coaxial relation upon said deck for rotation about an axis parallel to the axis of said supply and takeup reels and longitudinally intermediate same, capstan means mounted upon said deck for rotation about an axis parallel to said axis of said drums, means guiding magnetic tape from said supply reel about said capstan and in a helical path about said drums to said takeup reel, said path extending from an entrance point adjacent the first drum to an exit point adjacent the second drum with said tape being substantially diagonally bisected by a plane perpendicular to the axis of said drums and interposed therebetween into two diagonal halves respectively converging in directions away from said entrance and exit points and overlying said first and second drums, at least one magnetic transducer head mounted upon said second drum adjacent said plane, means coupled to said second drum for rotating same in a direction from said exit point towards the converging portion of the tape half overlying said second drum, means coupled to said capstan for rotating same to transport said tape in a direction from said entrance point towards said exit point, and means coupled between the capstan rotating means and said first drum to rotate the latter in a direction opposite to said second drum, said drums rotating at a speed sufficient to establish an air film beneath the tape extending about said drums.

10. In a magnetic recorder, the combination comprising cylindrical guide means having separate upper and lower drum portions, means for guiding a magnetic tape in a helical path about the drum portions, and means coupled to the drum portions for rotating the portions in opposite directions at speed sufficient to provide an air film between the drum portions and the tape as the tape is moved along the helical path.

References Cited

UNITED STATES PATENTS

| | | | |
|---|---|---|---|
| 3,075,049 | 1/1963 | Gordon et al. | 179—100.2 |
| 3,159,501 | 12/1964 | Maxey | 179—100.2 |

BERNARD KONICK, *Primary Examiner.*

H. STECKLER, *Assistant Examiner.*